(12) United States Patent
Morita (10) Patent No.: US 7,168,655 B2
(45) Date of Patent: Jan. 30, 2007

(54) REEL (75) Inventor: Kiyoo Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 185 days.

(21) Appl. No.: 10/456,911

(22) Filed: Jun. 9, 2003

(65) Prior Publication Data
US 2003/0226931 A1  Dec. 11, 2003

(30) Foreign Application Priority Data
Jun. 7, 2002  (JP) ............................. 2002-166608

(51) Int. Cl.
*B65H 75/14* (2006.01)
(52) U.S. Cl. .................. 242/610.4; 242/342; 242/348; 242/348.2
(58) Field of Classification Search ............. 242/610.4, 242/342, 348, 348.2
See application file for complete search history.

(56) References Cited

U.S. PATENT DOCUMENTS

| 3,625,455 | A | * | 12/1971 | Streets ....................... 242/345 |
|---|---|---|---|---|
| 4,723,731 | A | * | 2/1988 | Posso ....................... 242/423.1 |
| 6,318,659 | B1 | | 11/2001 | Zwettler et al. |
| 6,478,244 | B2 | * | 11/2002 | Zwettler et al. ............. 242/348 |
| 6,736,345 | B2 | * | 5/2004 | Hiraguchi et al. ....... 242/345.2 |
| 6,857,591 | B2 | * | 2/2005 | Hiraguchi et al. .......... 242/348 |
| 6,913,219 | B2 | * | 7/2005 | Hiraguchi et al. .......... 242/348 |
| 6,954,335 | B2 | * | 10/2005 | Tsuyuki et al. ............. 360/132 |
| 2003/0226924 | A1 | * | 12/2003 | Morita ........................ 242/348 |

FOREIGN PATENT DOCUMENTS

JP  62-110681  5/1987

* cited by examiner

*Primary Examiner*—Kathy Matecki
*Assistant Examiner*—Sang Kim
(74) *Attorney, Agent, or Firm*—Sughrue Mion, PLLC

(57) ABSTRACT

A reel has: a hub which is cylindrical, which is molded of a resin material, and around which a recording tape is wound; and a flange provided at an end portion of the hub, and holding a transverse direction end portion of the recording tape. A ring-shaped member formed of metal is provided at the hub by insert molding. In accordance with the present invention, there is provided a reel in which can maintain a highly-accurate configuration of the hub, regardless of environmental changes.

12 Claims, 7 Drawing Sheets

REEL

BACKGROUND OF THE INVENTION

1. Field of the Invention

The present invention relates to a reel on which is wound a recording tape, such as a magnetic tape or the like, used for storing data of a computer or the like.

2. Description of the Related Art

Conventionally, among recording tape cartridges used as recording media used in external storage devices of computers and the like, there is a type in which a single reel, on which a recording tape such as a magnetic tape or the like is wound, is rotatably accommodated within a recording tape cartridge. The magnetic tape is used for storing data of a computer or the like, and important information is recorded thereon. Thus, the recording tape cartridge is structured such that the magnetic tape cannot be inadvertently pulled out therefrom when the recording tape cartridge is not being used (such as when the recording tape cartridge is being stored or the like), and also, so that trouble such as jamming of the tape or the like will not occur.

Recently, the storage capacity of recording tape cartridges has increased and, as a result, the amount of data which can be recorded has increased from several tens of GBs to several hundreds of GBs. In order to realize such an increase in storage capacity, the track pitch width has been decreased, or the thickness of the magnetic tape has been decreased. Accordingly, high dimensional accuracy is required of the recording tape cartridge itself as well. In particular, the dimensions and the configuration of the reel on which the magnetic tape is wound must be highly accurate.

However, at a reel, both the cylindrical hub on which the magnetic tape is wound, and the upper and lower flanges which are provided at the upper and lower end portions of the hub and which hold the transverse direction end portions of the magnetic tape wound around the hub, are molded of a resin material. Thus, there are cases in which slight deformation occurs due to changes in temperature and/or humidity at the time when the recording tape cartridge is being transported. When such deformation arises at the hub in particular, a problem arises in that a fair amount of the magnetic tape is adversely affected thereby, i.e., bending or the like due to this deformation arises at the magnetic tape itself.

SUMMARY OF THE INVENTION

In view of the aforementioned, an object of the present invention is to provide a reel in which the high accuracy of the dimensions and the configuration of a hub can be maintained, regardless of changes in the environment such as the temperature, the humidity, or the like.

In order to achieve the above object, a reel relating to the present invention comprises: a hub which is cylindrical, which is molded of a resin material, and around which a recording tape is wound; and a flange provided at an end portion of the hub, and holding a transverse direction end portion of the recording tape, wherein a ring-shaped member formed of metal is provided at the hub by insert molding.

In accordance therewith, even if the hub, which is formed of resin, attempts to deform due to changes in the environment such as the temperature, the humidity or the like, such deformation is suppressed by the ring-shaped member which is formed of metal and provided at the hub by insert molding. Further, similarly, even if the recording tape contracts in the winding/tightening direction (the radial direction of the hub) due to changes in the environment such as the temperature, the humidity or the like, deformation due to such contraction is suppressed because the strength of the hub is improved by the ring-shaped member formed of metal. Accordingly, it is possible to obtain a hub whose dimensional accuracy can be maintained high, and a recording tape wound thereon is not adversely affected.

DESCRIPTION OF THE PREFERRED EMBODIMENT

Hereinafter, a reel relating to an embodiment of the present invention will be described on the basis of the drawings. Note that the reel relating to the present invention may be applied to a one-reel-type recording tape cartridge in which a single reel is accommodated within a case, or to a two-reel-type recording tape cartridge in which a pair of reels are accommodated within a case. Here, explanation will be given by using, as an example, a one-reel-type recording tape cartridge. Moreover, for convenience of explanation, the direction of loading the recording tape cartridge into a drive device is called the forward direction, and the front-back, left-right, and top-bottom directions are expressed on the basis of this forward direction. Further, a magnetic tape is used as the recording tape, and hereinafter, explanation will be given of a magnetic tape cartridge 10.

Figure 1:
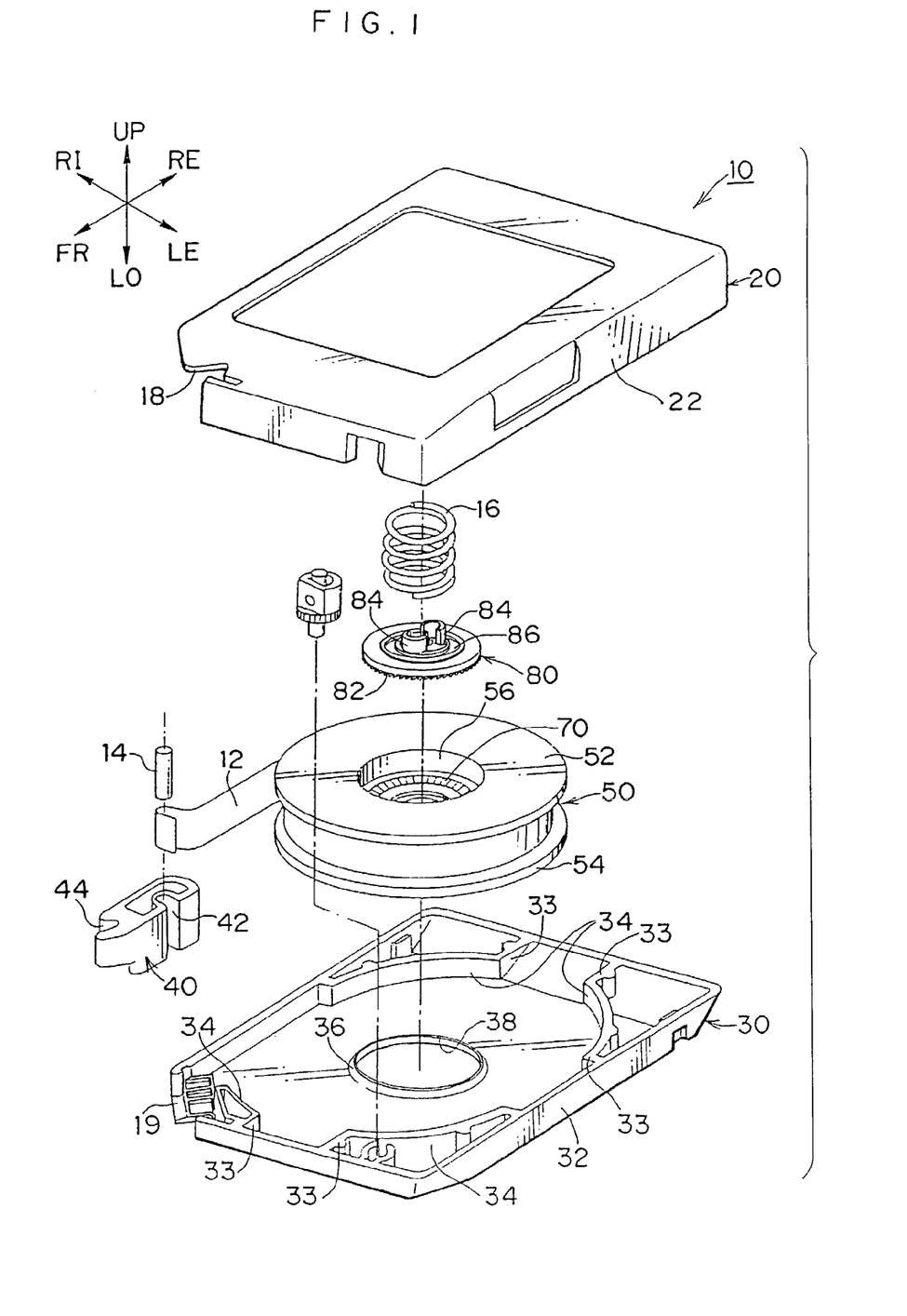
FIG. 1 is an exploded perspective view of a magnetic tape cartridge having a reel relating to the present invention.
Figure 2:
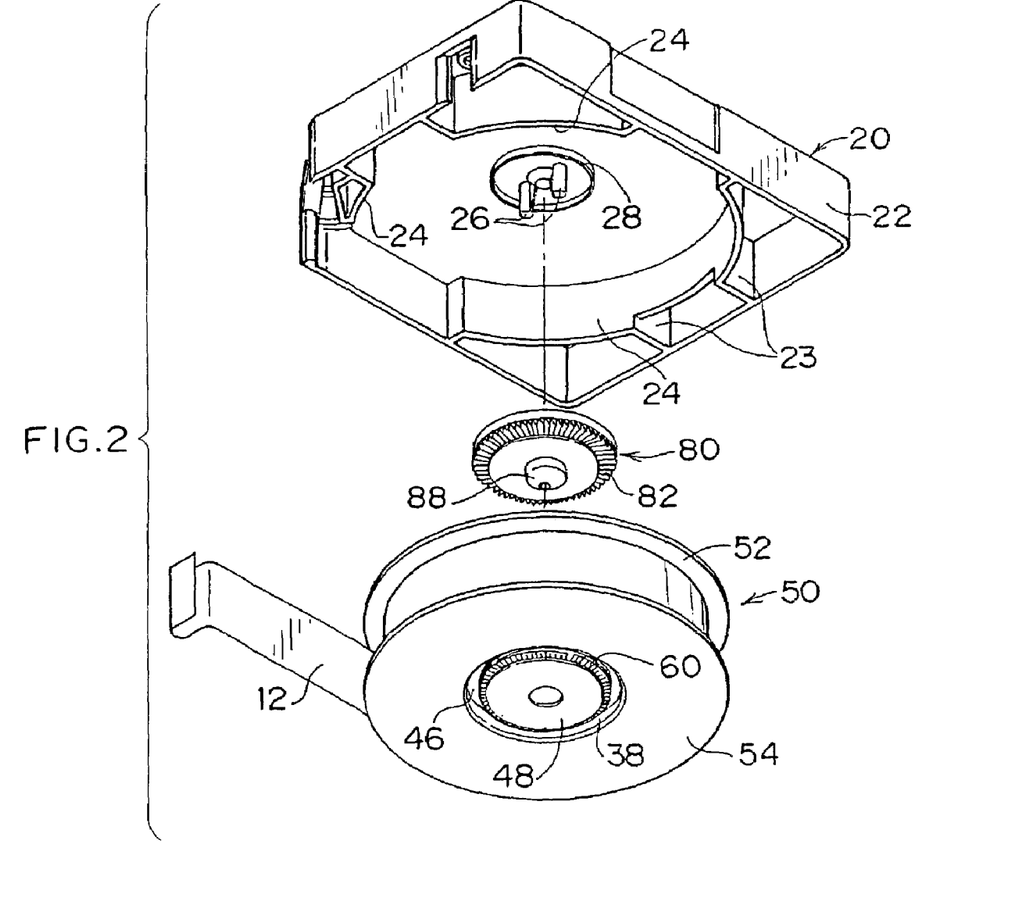
FIG. 2 is a perspective view, as seen from below, of the reel relating to the present invention, a braking member, and an upper case.
Figure 3:
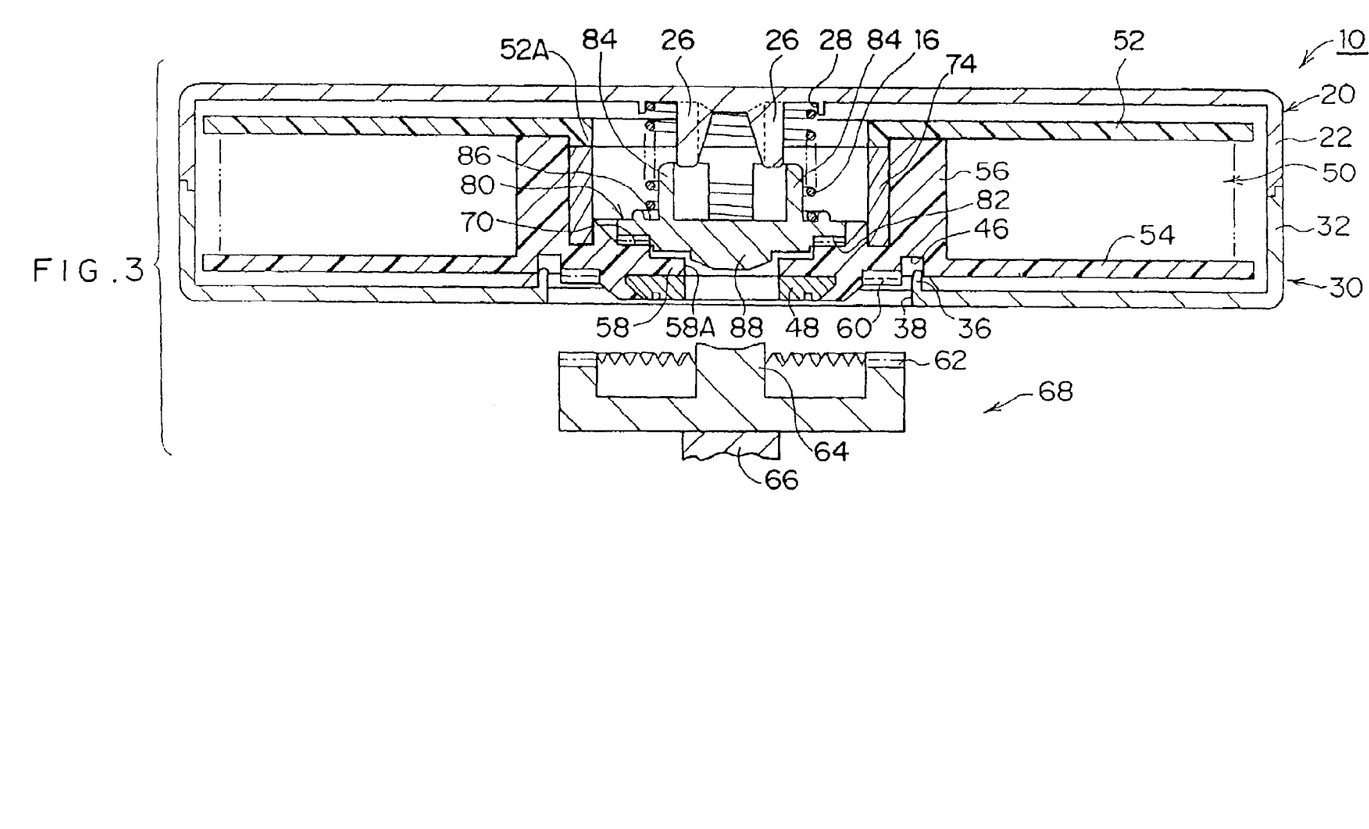
FIG. 3 is a side sectional view of a driving device and the magnetic tape cartridge which has the reel relating to the present invention.

First, the overall structure of the magnetic tape cartridge 10 will be described. As shown in FIGS. 1 through 3, the magnetic tape cartridge 10 has an upper case 20 and a lower case 30 which are formed of a synthetic resin. The magnetic tape cartridge 10 is formed in a substantially rectangular box shape by peripheral walls 22, 32 of the upper case 20 and the lower case 30 being welded together by ultrasonic welding or the like. Play restricting walls 24, 34 stand erect at the inner surfaces of the upper case 20 and the lower case 30, respectively. The inner diameters of the play restricting walls 24, 34 are formed to be slightly larger than the outer diameters of an upper flange 52 and a lower flange 54 of a reel 50. The reel 50 is rotatably accommodated at the inner sides of the play restricting walls 24, 34.

A plurality of ribs 23 are provided between the play restricting wall 24 and the peripheral wall 22 of the upper case 20. A plurality of ribs 33 are provided between the play restricting wall 34 and the peripheral wall 32 of the lower case 30. The play restricting wall 24 and the peripheral wall 22 are connected by the ribs 23, and the play restricting wall 34 and the peripheral wall 32 are connected by the ribs 33. The play restricting walls 24, 34 and the peripheral walls 22, 32 are thereby strengthened.

The reel 50 is structured by a reel hub 56 which is cylindrical and formed of a synthetic resin, and the upper flange 52 and the lower flange 54 which are provided at the end portions of the reel hub 56. The widthwise direction end portions of a magnetic tape 12, which serves as an information recording/playback medium wound on the reel hub 56, are held at the upper flange 52 and the lower flange 54.

A bottom wall 58 is provided at the lower flange 54 of the reel hub 56. A hole portion 58A is formed in the center of the bottom wall 58. An annular reel gear 60 projects out from the bottom wall 58 at the bottom surface side of the bottom wall 58. The reel gear 60 can emerge from a circular open hole 38 provided at the center of the lower case 30, and meshes with a driving gear 62 provided at a drive device 68 so as to transmit rotational force to the reel 50.

An annular metal plate 48 is provided integrally with the inner side of the reel gear 60. Due to the metal plate 48 being attracted by a magnet (not shown) provided at the drive device 68, axial offset is prevented, and the meshed-together state of the reel gear 60 and the driving gear 62 can be maintained. On the other hand, an annular groove 46 is provided at the outer side of the reel gear 60. The reel 50 is positioned with respect to the lower case 30 due to a rib 36, which stands erect at the peripheral edge portion of the open hole 38, being inserted into the annular groove 46.

Further, an annular reel gear 70 is formed at the top surface side of the bottom wall 58 of the reel hub 56. The reel gear 70 can mesh with a braking gear 82 which is formed at the outer peripheral portion of the bottom surface of a substantially disc-shaped braking member 80 which can be accommodated within the reel hub 56. Ribs 84, which are substantially U-shaped as seen in plan view (and are referred to hereinafter as "U-shaped ribs"), stand erect at the top surface of the braking member 80 such that the open sides thereof oppose each other. On the other hand, a pair of anchor pins 26 are provided vertically at the center of the inner surface of the upper case 20, and can engage with the U-shaped ribs 84.

An annular groove 86 is provided at the outer side of the U-shaped ribs 84 of the braking member 80. An annular projection 28 projects at the outer side of the anchor pins 26 of the upper case 20. A spring 16 is provided between the braking member 80 and the upper case 20 by being held between the annular projection 28 and the annular groove 86.

Accordingly, when the magnetic tape cartridge 10 is not being used, the anchor pins 26 are inserted into the U-shaped ribs 84, such that rotation of the braking member 80 is impeded. The braking gear 82 of the braking member 80 whose rotation has been impeded is urged toward the reel gear 70, and strongly meshes with the reel gear 70 within the reel hub 56. In this way, inadvertent rotation of the reel 50 is prevented.

On the other hand, a projection 88, which is substantially solid-cylindrical and which can be inserted through the hole portion 58A, projects at the center of the bottom surface of the braking member 80. Before the reel gear 60 meshes with the driving gear 62 and rotational force is transmitted to the reel 50, a meshing releasing pin 64, which is provided at the distal end portion of a rotating shaft 66 provided at the drive device 68, abuts the projection 88. The braking member 80 is thereby pushed upward against the urging force of the spring 16, and the meshing of the braking gear 82 and the reel gear 70 is released. In this way, the reel 50 is able to rotate.

Further, a leader block 40 is attached to the distal end portion of the magnetic tape 12 due to an elastic pin 14 and the distal end of the magnetic tape 12 being fit into a concave portion 42 of the leader block 40. Opening portions 18, 19 are formed at the front right corner portions of the peripheral wall 22 of the upper case 20 and the peripheral wall 32 of the lower case 30, respectively.

The opening portions 18, 19 are for enabling the magnetic tape 12, which is wound on the reel 50, to be pulled out to the exterior. An unillustrated pull-out pin provided at the drive device engages with an engagement portion 44 formed at the distal end of the leader block 40, and pulls the leader block 40 out from the opening portions 18, 19, and fits the leader block 40 in a take-up reel (not shown) provided at the drive device.

Thereafter, by driving the reel 50 and the take-up reel to rotate synchronously, data is recorded onto the magnetic tape 12 or data recorded on the magnetic tape 12 is played back, while the magnetic tape 12 is successively taken-up onto the take-up reel. Further, when the magnetic tape cartridge 10 is not being used, the leader block 40 is anchored on the peripheral edges of the opening portions 18, 19 and closes the opening portions 18, 19.

Figure 4:
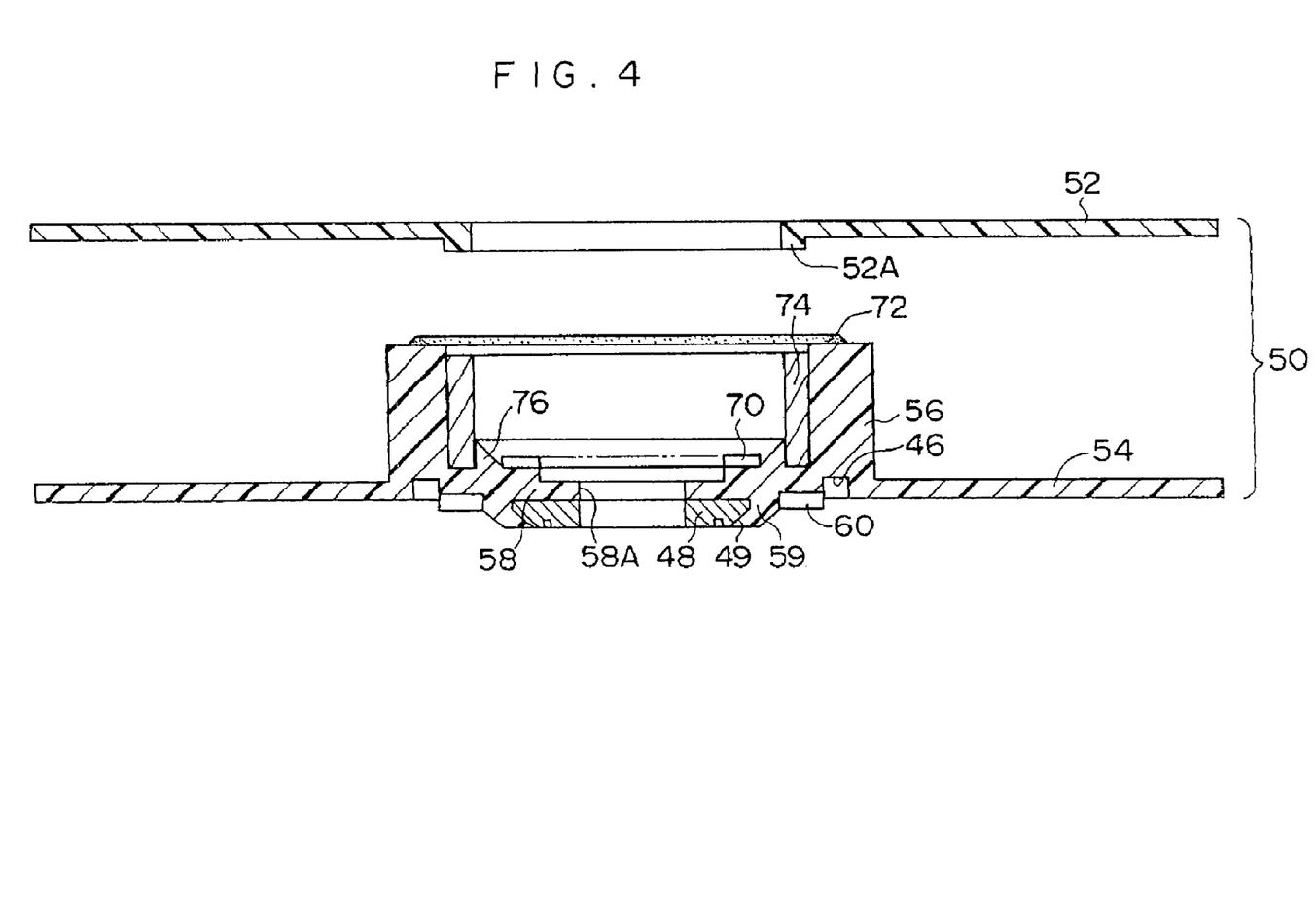
FIG. 4 is an exploded side sectional view of the reel relating to the present invention.

Next, the reel 50 relating to the present invention will be described in detail. Note that repeat explanation will not be given of portions which have been described above. As shown in FIGS. 3 and 4, the reel hub 56 and the lower flange 54, which structure the reel 50, are molded integrally of a resin material. A welding material (portion) 72 for ultrasonic welding, which is substantially triangular in cross-section, projects at the distal end surface (the top surface) of the reel hub 56. The upper flange 52 is placed on the peak portion of this welding material 72, and in this state, by melting the welding material 72 by ultrasonic waves, the upper flange 52 is welded onto the distal end surface (top surface) of the reel hub 56 such that the reel 50 is formed.

The reel hub 56 and the upper flange 52 are molded by using resin materials which are compatible with one another. In this way, the reel hub 56 and the upper flange 52 can be welded together by ultrasonic waves. Examples of the types of resin materials are combinations such as PMMA and ABS, AS and ABS, PC and PC, and the like.

Figure 5:
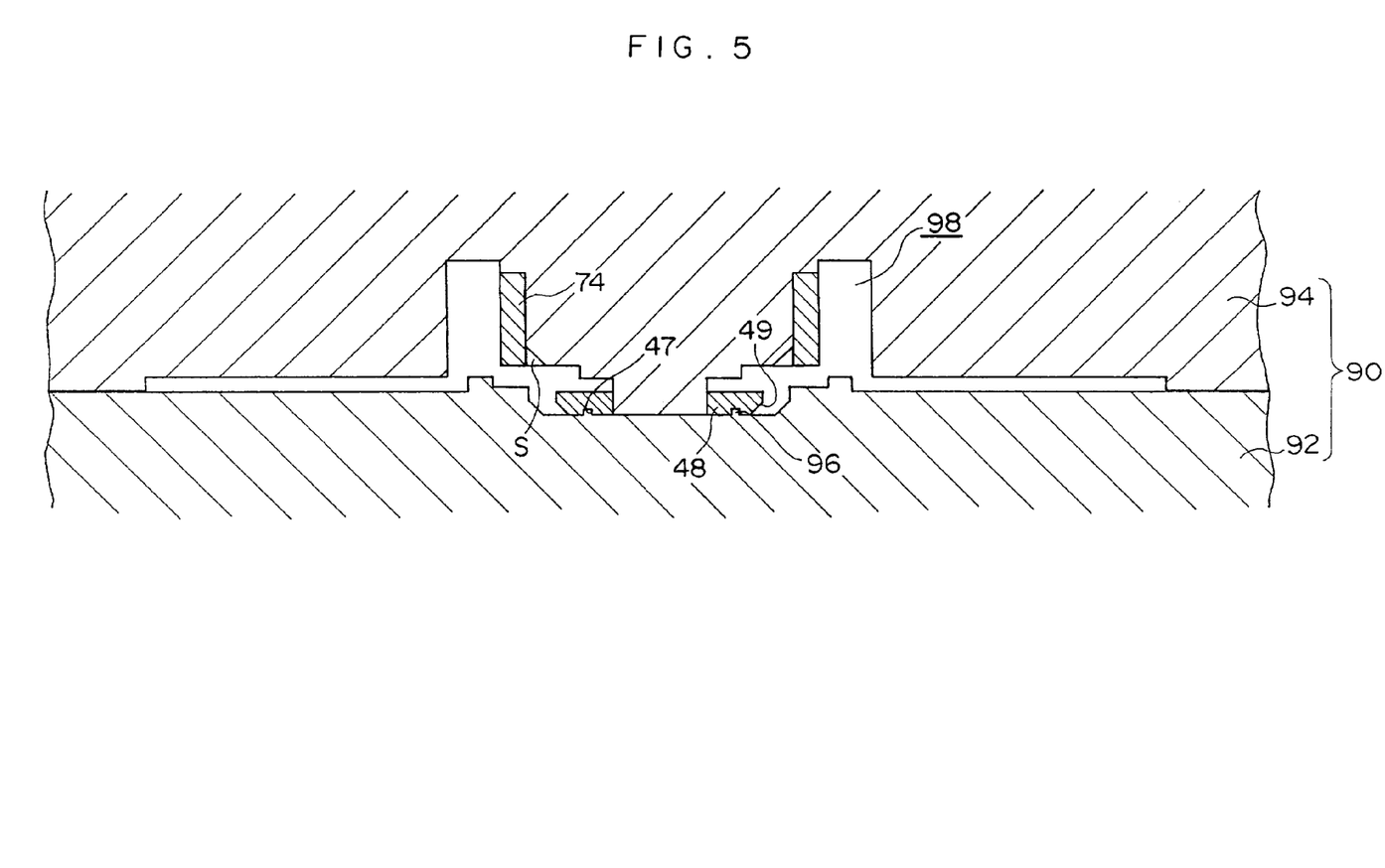
FIG. 5 is a schematic side sectional view showing a mold for molding a reel hub and a lower flange of the reel relating to the present invention.

As described above, the metal plate 48 is provided at the inner side of the reel gear 60. As shown in FIG. 5, the metal plate 48 is inserted and integrally molded in a mold 90 which molds the reel hub 56 and the lower flange 54. A fixed side mold plate 92 and a movable side mold plate 94 are provided at the mold 90. In the state in which the metal plate 48 is fixed to the fixed side moldplate 92, the mold 90 is clamped, and a molding material (resin material) is filled into a cavity 98 formed by the fixed side mold plate 92 and the movable side mold plate 94.

Here, an annular concave portion 47 is provided in one end side (the bottom surface side) of the metal plate 48. When the metal plate 48 is set at the fixed side mold plate 92, the annular concave portion 47 fits with an annular convex portion 96 formed at the fixed side mold plate 92, and the metal plate 48 is positioned and fixed at the fixed side mold plate 92. Further, an annular taper portion 49 serving as a bitten-in portion is provided at the peripheral edge portion of one end side (the lower surface side) of the metal plate 48.

In the state in which the metal plate 48 is set at the fixed side metal plate 92, there is a gap between the taper portion 49 of the metal plate 48 and the fixed side mold plate 92. At the time of molding, due to the molding material (resin material) flowing into this gap, an annular claw portion 59, which serves as a biting-in portion which bites into the outer peripheral edge of the metal plate 48, is formed at the reel hub 56.

Due to the claw portion 59 biting into the taper portion 49 of the metal plate 48, the metal plate 48 becomes integral with the reel hub 56 and the lower flange 54. However, provided that there is a structure in which the metal plate 48, the reel hub 56, and the lower flange 54 can be made integral by insert molding, any structure suffices, and the present invention is not limited to the illustrated structure.

Further, a ring-shaped member 74 formed of metal (and hereinafter called "metal ring") is provided integrally by insert molding at the inner side of the reel hub 56. The material of the metal ring 74 can be appropriately selected in accordance with the resin material used for the reel hub 56 and the configuration (such as the thickness and the like) of the reel hub 56. However, a non-magnetic stainless material is particularly preferable.

The outer peripheral surface of the metal ring 74 is a roughened surface or a knurled surface in which the resin material can get caught. As shown in FIG. 5, after fitting the metal ring 74 in the movable side mold plate 94, the mold 90 is clamped, and the molding material (resin material) is filled into the cavity 98. In this way, the outer peripheral surface of the metal ring 74 and the inner peripheral surface of the reel hub 56 can be adhered together.

Note that, at the time of fitting the metal ring 74 into the movable side mold plate 94, a gap S is formed between the movable side mold plate 94 and the inner peripheral edge of the bottom end side of the metal ring 74. At the time of molding, due to the molding material (resin material) flowing into the gap S, an annular claw portion 76, which tightly contacts the inner peripheral edge of the bottom end side of the metal ring 74, is formed. In this way, the metal ring 74 is mounted even more stably to the reel hub 56.

In this way, in the same way as the above-described metal plate 48, the metal ring 74 is provided integrally with the reel hub 56. Due to the outer peripheral surface of the metal ring 74, which is shown in FIGS. 3 through 5, being adhered to the inner peripheral surface of the reel hub 56, the inner peripheral surface of the metal ring 74 is exposed at the inner side of the reel hub 56. Accordingly, it is preferable that the inner peripheral surface of the metal ring 74 in this case be formed as a smooth surface.

Further, the distal end surface (top surface) of the metal ring 74 is formed to a height which reaches a position which is a predetermined length lower than the distal end surface (top surface) of the reel hub 56. A boss 52A of the same height as this predetermined length is formed at the bottom surface of the upper flange 52. When the upper flange 52 is placed on the peak portion of the welding material 72, the boss 52A engages (contacts) the inner peripheral surface of the reel hub 56. Accordingly, in this state, when the upper flange 52 is welded to the distal end surface (top surface) of the reel hub 56 by ultrasonic welding, the distal end surface (bottom surface) of the boss 52A and the distal end surface (top surface) of the metal ring 74 abut one another, and the reel 50 which has high dimensional accuracy is obtained.

Figure 6A:
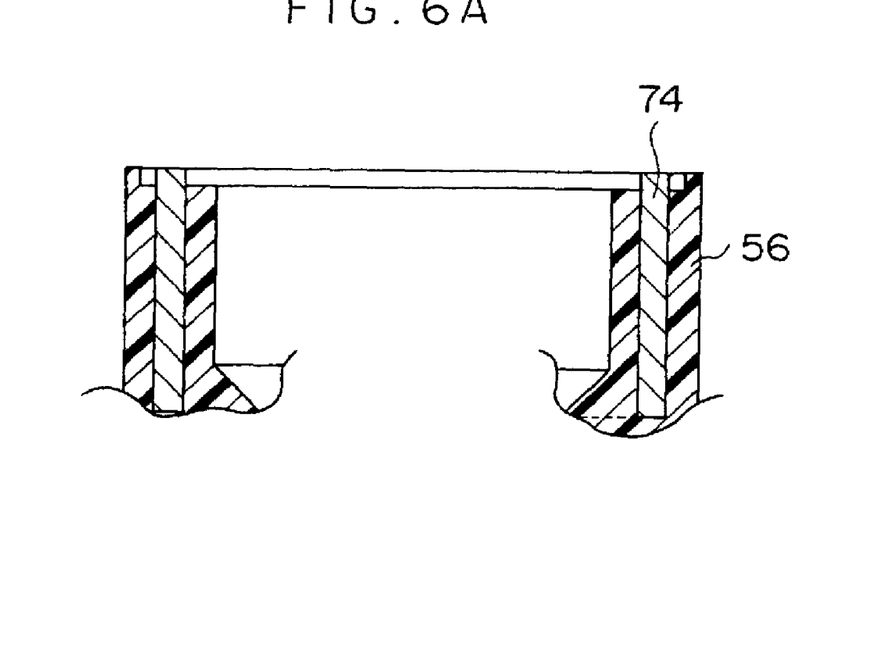
FIG. 6A is a schematic side sectional view showing a modified example of the reel relating to the present invention.
Figure 6B:
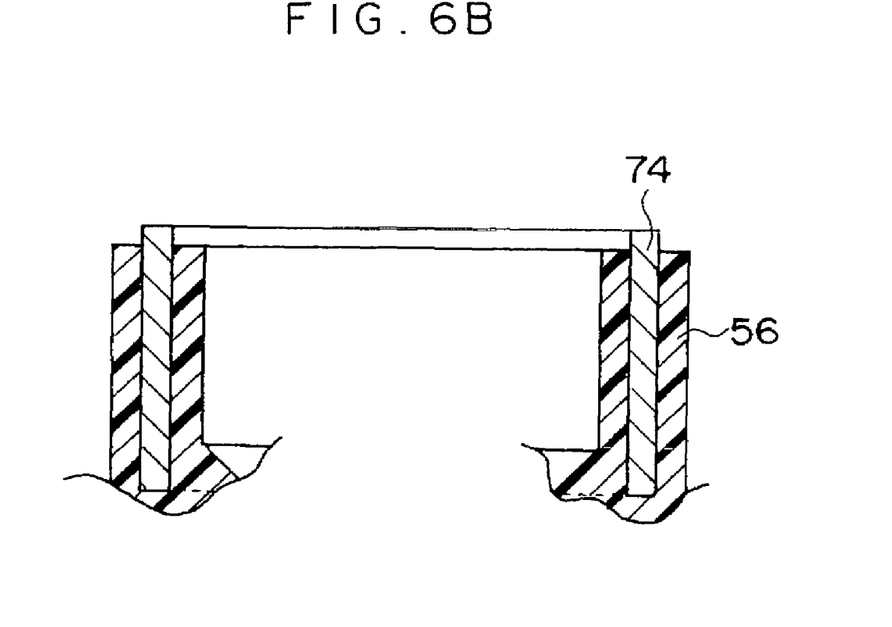
FIG. 6B is a schematic side sectional view showing another modified example of the reel relating to the present invention.
Figure 7A:
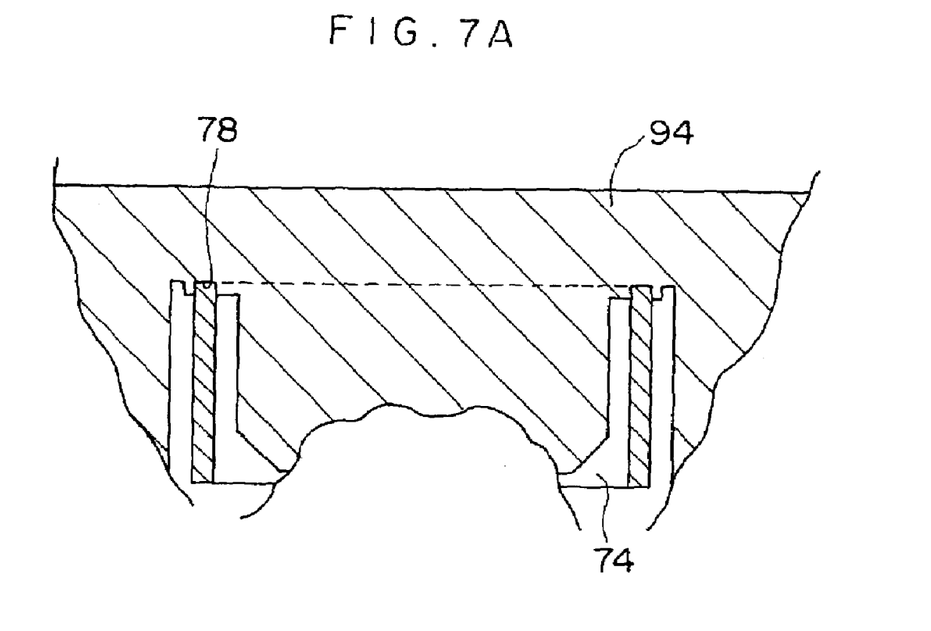
FIG. 7A is a schematic side sectional view showing main portions of a mold for molding the reel of FIG. 6A.
Figure 7B:
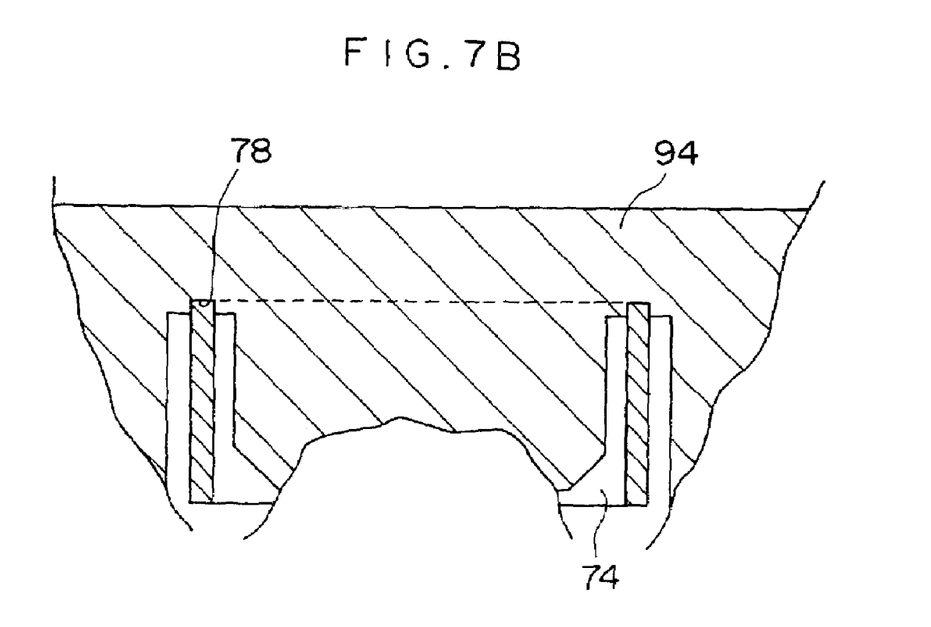
FIG. 7B is a schematic side sectional view showing main portions of a mold for molding the reel of FIG. 6B.

Further, it is possible to, rather than carrying out insert molding such that the metal ring 74 is exposed to the inner side of the reel hub 56, carry out insert molding such that the metal ring 74 is embedded within the reel hub 56 as shown in FIGS. 6A and 6B. In this case, at least one of the outer peripheral surface and the inner peripheral surface of the metal ring 74 is made to be a roughened surface or a knurled surface, and as shown in FIGS. 7A and 7B, an annular concave portion 78, which holds the upper end portion of the metal ring 74, is provided in the movable side mold plate 94. In this structure, the metal ring 74 can be positioned and fixed so that the metal ring 74 is stable at the time of molding.

By using such a structure, a reel hub 56 in which the metal ring 74 is embedded in a substantially central portion in the direction of thickness thereof is molded. Further, at the upper portion thereof, either the distal end surface (top surface) of the outer side of the reel hub 56 and the distal end surface (top surface) of the metal ring 74 are molded to the same height as shown in FIG. 6A, or the distal end surface (top surface) of the metal ring 74 projects out slightly from the distal end surface (top surface) of the reel hub 56 as shown in FIG. 6B. Note that, in both cases, the configurations and the like of the upper flange 52 and the boss 52A can of course be changed appropriately.

In any case, when the metal ring 74 and the reel hub 56 are provided integrally, the strength of the reel hub 56 can be improved. Namely, as compared with resin, metal has a lower coefficient of linear expansion and hardly deforms at all. Thus, even if, due to changes in the environment such as the temperature or the humidity or the like, the resin reel hub 56 attempts to deform itself, or the magnetic tape 12 contracts in the winding/tightening direction and attempts to deform the reel hub 56, deformation of the reel hub 56 can be suppressed by the metal ring 74 which is molded integrally with the reel hub 56.

Accordingly, the reel hub 56 which has high dimensional accuracy can be obtained, and the magnetic tape 12 wound therearound is not adversely affected. Moreover, the metal ring 74 is exposed to the inner side of the reel hub 56, or is provided so as to be embedded in the substantially central portion in the direction of thickness of the reel hub 56. Thus, when the temperature is high, if it takes a relatively long time for the temperature of the metal ring 74 to fall, the magnetic tape 12 is not adversely affected.

As described above, in accordance with the present invention, the strength of the hub can be increased and deformation thereof can be suppressed by the ring-shaped member formed of metal which is provided at the hub by insert molding. Accordingly, a hub having high dimensional accuracy can be obtained, and the recording tape wound therearound is not adversely affected.

What is claimed is:

1. A reel comprising:
    a hub which is cylindrical, which is molded of a resin material, and around which a recording tape is wound; and
    a flange provided at an end portion of the hub, and holding a transverse direction end portion of the recording tape,
    wherein a ring-shaped member formed of metal is provided at the hub by insert molding;
    wherein the ring-shaped member formed of metal has a bitten-in portion, and the hub has a biting-in portion of a configuration which is complementary to the bitten-in portion, and the ring-shaped member and the hub are made integral by the biting-in portion penetrating into the bitten-in portion.

2. The reel of claim 1, wherein the ring-shaped member formed of metal is disposed concentrically with the hub.

3. The reel of claim 2, wherein the ring-shaped member formed of metal is embedded in the hub.

4. A reel comprising:
- a hub which is cylindrical, which is molded of a resin material, and around which a recording tape is wound; and
- a flange provided at an end portion of the hub, and holding a transverse direction end portion of the recording tape,
- wherein a ring-shaped member formed of metal is provided at the hub by insert molding,
- wherein the ring-shaped member formed of metal is disposed concentrically with the hub
- wherein the ring-shaped member formed of metal is provided along an inner periphery of the hub, and the hub has an annular claw portion which contacts one inner peripheral edge of the ring-shaped member, and the ring-shaped member is fixed to the inner periphery of the hub via the claw portion.

5. The reel of claim 4, wherein another flange member is mounted to the hub at a side at another inner peripheral edge of the ring-shaped member.

6. The reel of claim 5, wherein a height of the ring-shaped member formed of metal is a predetermined height lower than a height of the hub, and a boss, which is annular and projects to the predetermined height and has a configuration corresponding to the ring-shaped member, is formed at a surface of the other flange member which surface abuts the hub, and the ring-shaped member is thereby fixed to the hub via the boss and the claw portion.

7. The reel of claim 4, wherein an inner peripheral surface of the ring-shaped member formed of metal is formed as a smooth surface.

8. The reel of claim 4, wherein an outer peripheral surface of the ring-shaped member formed of metal is one of a roughened surface and a knurled surface.

9. A reel comprising:
- a hub which is cylindrical, which is molded of a resin material, and around which a recording tape is wound;
- a flange provided at an end portion of the hub, and holding a transverse direction end portion of the recording tape; and
- a ring-shaped member formed of metal and fixed to the hub so as to be concentric with the hub,
- wherein the hub has a biting-in portion of a configuration which is complementary to a portion of the ring-shaped member formed of metal, and the ring-shaped member and the hub are made integral by the biting-in portion of the hub penetrating into the ring-shaped member.

10. The reel of claim 9, wherein the ring-shaped member formed of metal is provided at the hub by insert molding.

11. The reel of claim 9, wherein the ring-shaped member formed of metal is embedded in the hub.

12. The reel of claim 9, wherein the ring-shaped member formed of metal has a bitten-in portion, and the biting-in portion is complementary to the bitten-in portion, and the ring-shaped member and the hub are made integral by the biting-in portion engaging with the bitten-in portion.

* * * * *